United States Patent (10) Patent No.: US 7,415,338 B2
Monji et al. (45) Date of Patent: Aug. 19, 2008

(54) APPARATUS FOR CONTROLLING AUXILIARY EQUIPMENT OF VEHICLE

(75) Inventors: Tatsuhiko Monji, Hitachinaka (JP); Masaaki Fukuhara, Mito (JP); Katsuo Ouchi, Hitachinaka (JP); Isao Furusawa, Hitachinaka (JP); Hiroyuki Kasuya, Hitachinaka (JP); Jun Higashino, Wako (JP); Fujio Iida, Wako (JP); Katsumi Otsubo, Wako (JP)

(73) Assignees: Hitachi, Ltd., Tokyo (JP); Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 11/003,008

(22) Filed: Dec. 3, 2004

(65) Prior Publication Data

US 2005/0134483 A1 Jun. 23, 2005

(30) Foreign Application Priority Data

Dec. 5, 2003 (JP) ............................. 2003-407995

(51) Int. Cl.
*B60Q 1/14* (2006.01)
*G06F 7/00* (2006.01)
(52) U.S. Cl. ........................... 701/49; 315/82; 362/464; 250/208.4
(58) Field of Classification Search .................. 701/36, 701/49, 1; 340/933, 937, 425.5, 942, 815.4, 340/935, 469; 307/10.8; 315/79, 80, 82, 315/159; 362/460, 464, 465, 466; 250/208.1, 250/208.4, 214, 214 AL, 214 D
See application file for complete search history.

(56) References Cited

U.S. PATENT DOCUMENTS

| | | | | |
|---|---|---|---|---|
| 4,845,619 A * | 7/1989 | Steely et al. | .................. | 701/49 |
| 5,329,206 A * | 7/1994 | Slotkowski et al. | ......... | 315/159 |
| 5,787,370 A * | 7/1998 | Kutscher et al. | .............. | 701/49 |
| 5,837,994 A | 11/1998 | Stam et al. | ............... | 250/208.1 |
| 5,990,469 A * | 11/1999 | Bechtel et al. | ........... | 250/208.1 |
| 6,049,171 A | 4/2000 | Stam et al. | .................... | 315/82 |
| 6,255,639 B1 | 7/2001 | Stam et al. | .................. | 250/208 |
| 6,401,020 B1 * | 6/2002 | Neumann | .................... | 701/49 |
| 6,459,387 B1 * | 10/2002 | Kobayashi et al. | .......... | 340/988 |
| 6,671,640 B2 * | 12/2003 | Okuchi et al. | ................. | 702/95 |

(Continued)

FOREIGN PATENT DOCUMENTS

DE 4111210 A1 10/1992

(Continued)

OTHER PUBLICATIONS

Japanese office action dated Apr. 1, 2008 with partial English translation.

*Primary Examiner*—Jack W. Keith
*Assistant Examiner*—Edward Pipala
(74) *Attorney, Agent, or Firm*—Crowell & Moring LLP

(57) ABSTRACT

An apparatus for controlling operation of auxiliary equipment of a vehicle by receiving an output of a surroundings detection sensor for detecting the surrounding of the vehicle and an output of the vehicle information sensor, for detecting operation of the vehicle, wherein the distance to and the direction of an overtaking vehicle, an oncoming vehicle, or a preceding vehicle and the light intensities of the right and the left headlamps are controlled independently. A plurality of processes required for controlling the vehicle auxiliary equipment are performed by the time division processing.

23 Claims, 13 Drawing Sheets

U.S. PATENT DOCUMENTS

| | | | |
|---|---|---|---|
| 6,816,763 B2 * | 11/2004 | Tsukaoka | 701/36 |
| 6,928,180 B2 * | 8/2005 | Stam et al. | 382/104 |
| 2002/0060522 A1 * | 5/2002 | Stam et al. | 315/82 |
| 2002/0135468 A1 * | 9/2002 | Bos et al. | 340/436 |
| 2003/0114974 A1 * | 6/2003 | Smith et al. | 701/49 |
| 2004/0054454 A1 * | 3/2004 | Tsukaoka | 701/36 |
| 2004/0143380 A1 * | 7/2004 | Stam et al. | 701/36 |
| 2004/0153225 A1 * | 8/2004 | Stam et al. | 701/36 |
| 2005/0010348 A1 * | 1/2005 | Panopoulos | 701/49 |

FOREIGN PATENT DOCUMENTS

| | | |
|---|---|---|
| DE | 4136427 A1 | 5/1993 |
| DE | 4439556 A1 | 5/1996 |
| DE | 10011686 A1 | 9/2001 |
| EP | 1376154 A1 | 1/2004 |
| JP | 56-108323 A | 8/1981 |
| JP | 6-50111 U | 7/1994 |
| JP | 6-275104 A | 9/1994 |
| JP | 7-52706 A | 2/1995 |
| JP | 9-109771 A | 4/1997 |
| JP | 10-29462 A | 2/1998 |
| JP | A-2001-519744 | 10/1998 |
| JP | 10-315844 A | 12/1998 |
| JP | 11-91436 A | 4/1999 |
| JP | A-11-112968 | 4/1999 |
| JP | A-2002-526317 | 3/2000 |
| JP | 2001-213228 A | 8/2001 |
| JP | 2002-29331 A | 1/2002 |
| JP | 2002-79896 A | 3/2002 |

* cited by examiner

APPARATUS FOR CONTROLLING AUXILIARY EQUIPMENT OF VEHICLE

BACKGROUND OF THE INVENTION

The present invention relates to a control apparatus for controlling auxiliary equipment of a vehicle such as headlamps, side lamps, and wipers and in particular, to a control device for controlling the vehicle auxiliary equipment according to an output from a sensor detecting the condition around the vehicle.

JP-A-2001-519744 (PCT) and the corresponding U.S. Pat. No. 5,837,994 discloses a system for calculating the headlamp setting light intensity as a function of the distance to a preceding vehicle or to an oncoming vehicle and the horizontal position and performs automatic dimming of the right and left headlamps simultaneously.

Moreover, JP-A-11-112968 discloses a system for connecting an image processing device and a plurality of vehicle electronic devices via an in-vehicle LAN. According to this system, in response to an event request from the vehicle electronic device, an image processing result is sent back from the image processing device so as to operate the vehicle electronic device.

Moreover, JP-A-2002-526317 (PCT) and the corresponding U.S. Pat. No. 6,049,171 discloses a system for reducing the illumination range of the continuously changing lamp of a controller vehicle when a vehicle ahead of the headlamps of the controlled vehicle is in the glare area and otherwise, setting the lamp to the full illumination range.

In the example disclosed in JP-A-2001-519744 (PCT), (U.S. Pat. No. 5,837,994) when a vehicle overtakes a controlled vehicle, in the controlled vehicle, the light intensity of the headlamp opposite to the headlamp of the overtaken side and the headlamp of the overtaken side is reduced to the same light intensity. Accordingly, brightness of the illumination of the overtaken side and the opposite side of the controlled vehicle becomes insufficient.

In the example of JP-A-11-112968, when an event request is made from a vehicle electronic device, the vehicle electronic device is connected to the image processing device by one-to-one connection. Accordingly, when identifying an obstacle of high priority, a walker, and a white line on the road, image acquisition and processing are repeated and it is impossible to effectively operate the image processing device.

In the example of JP-A-2002-526317 (PCT) (U.S. Pat. No. 6,049,171), for example, when an oncoming vehicle suddenly appears ahead, the headlamps of the controlled vehicle are gradually reduced in light intensity and the oncoming vehicle comes into a glare area to dazzle the driver.

SUMMARY OF THE INVENTION

It is therefore an object of the present invention to provide an apparatus capable of appropriately illuminating the front of a vehicle without dazzling the driver of the overtaking vehicle, the oncoming vehicle, or the preceding vehicle.

Another object of the present invention is to provide a system capable of effectively executing processing of the image processing device and the control device connected to the vehicle auxiliary equipment.

According to the present invention, in the vehicle auxiliary equipment control apparatus for inputting the output of surroundings detection sensor detecting the condition around the vehicle and the output of the vehicle information sensor detecting the vehicle operation and controlling the operation of the vehicle auxiliary equipment, the distance up to the overtaking vehicle, the oncoming vehicle, or the preceding vehicle is calculated according to the output of the surroundings detection sensor so as to independently control the light intensity and/or capable illumination distance of the right and the left headlamps.

Moreover, according to the present invention, in the vehicle auxiliary equipment control apparatus for inputting the output of the surroundings detection sensor for detecting the condition around the vehicle and/or the output of the vehicle information sensor for detecting the vehicle operation so as to control the headlamps as the auxiliary equipment, the headlamps are dimmed during the headlamp ON state and/or normal running and the headlamp lights are controlled so as to be gradually or continuously increased according to the output of the vehicle information sensor.

Consequently, according to the present invention, it is possible to assure a sufficiently far field of view ahead of a controlled vehicle without dazzling the drivers of the other vehicles.

Furthermore, according to the present invention, in the vehicle auxiliary equipment control apparatus for inputting the output of the surroundings detection sensor for detecting the condition around the vehicle and the output of the vehicle information sensor for detecting the vehicle operation so as to control the operation of the vehicle auxiliary equipment, a plurality of processes required for controlling the vehicle auxiliary equipment is performed by time division processing.

Furthermore, according to the present invention, in the vehicle auxiliary equipment control apparatus for inputting the output of the surroundings detection sensor for detecting the condition around the vehicle and controlling the operation of a plurality of auxiliary devices of the vehicle, the input signal from the surroundings detection sensor having a single optical system is output to the plurality of auxiliary devices.

Consequently, it is possible to effectively execute signal processing for operation of a plurality of auxiliary devices.

According to the present invention, it is possible to independently control the right and the left headlamps, i.e., their illumination light intensity and illumination beam distance. Moreover, the headlamps are set to a dimming state when the headlamps are turned on and/or when the normal running is in progress and the light intensity of the headlamps is stepwise or continuously increased according to the output of surroundings detection sensor and/or the vehicle information sensor. Accordingly, when using the headlamps, it is possible to assure a field of views as far as possible without dazzling the drivers of other vehicles such as an oncoming vehicle, an overtaking vehicle, and a preceding vehicle.

According to the present invention, it is possible to effectively operate the control apparatus for controlling the operation of a plurality of auxiliary devices arranged on a vehicle, especially an image processing device.

Other objects, features and advantages of the invention will become apparent from the following description of the embodiments of the invention taken in conjunction with the accompanying drawings.

DESCRIPTION OF THE EMBODIMENT

Figure 1:
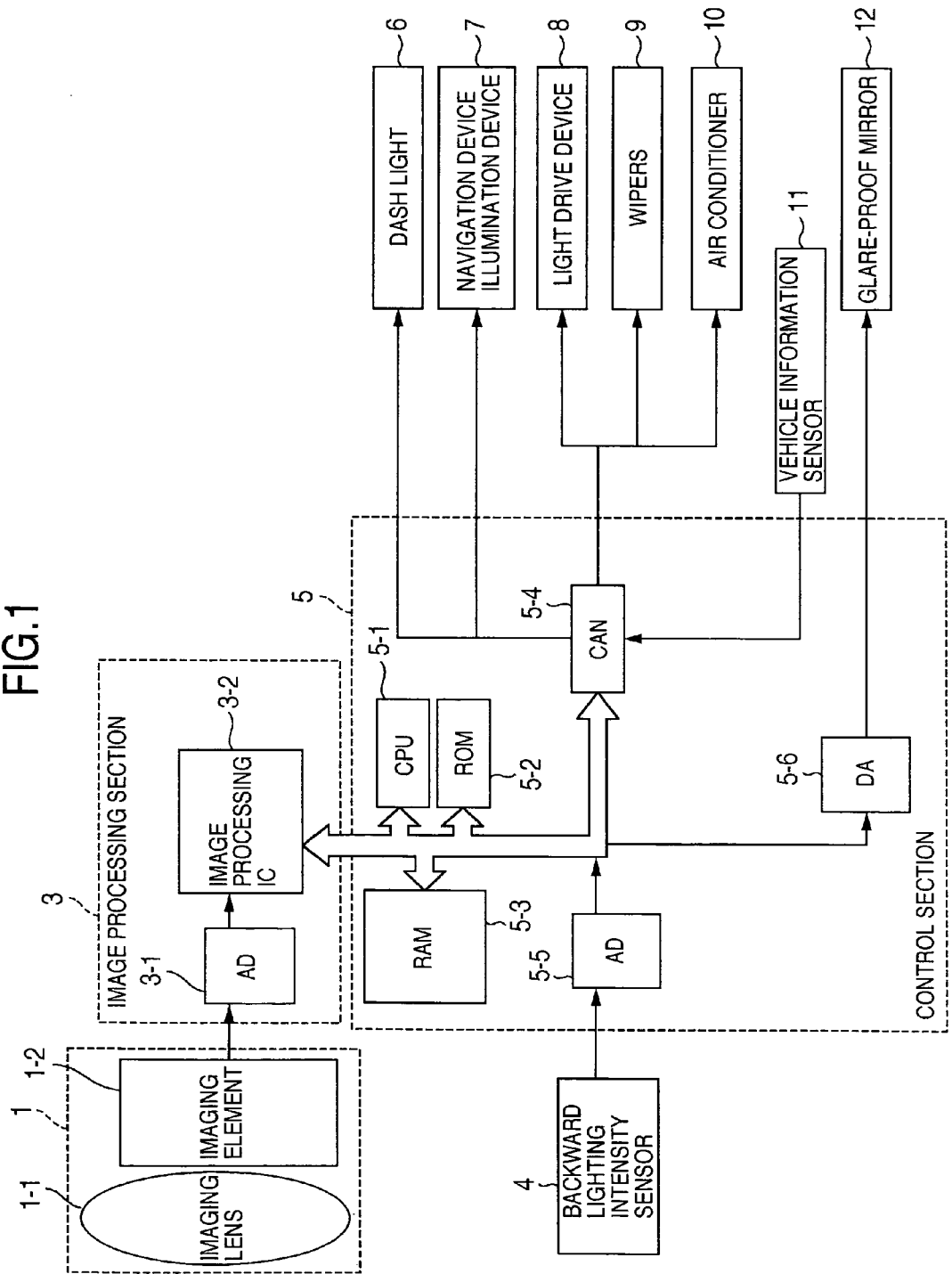
FIG. 1 shows configuration of a system including a vehicle auxiliary equipment control device.

Description will now be directed to an embodiment with reference to FIG. 1. FIG. 1 shows a system including a sensor, auxiliary equipment, and auxiliary equipment control device mounted on a vehicle. As shown in the figure, this system has a surroundings detection sensor 1, an image processing section 3, a backward luminance sensor for detecting the luminance backward of a vehicle, a control section 5, a dash light 6, a navigation device illumination device 7, a light drive device 8, a wiper, an air conditioner 10 including a defroster, a vehicle information sensor 11 recognizing operation of the controlled vehicle, and a glare-proof mirror having the glare-preventing function.

The surroundings detection sensor may be any sensor which can detect the condition around the vehicle. For example, it may be an imaging device, a radar device, a photoelectric sensor, or a combination of them. However, hereinafter, the surroundings detection sensor will be explained as an imaging device 1.

The imaging device 1 includes an imaging lens 1-1 and a imaging element (CCD: Charge Coupled Device) 1-2. The image processing section 3 includes an AD (Analog Digital) converter 3-1 and an image processing IC (Integration Circuit) 3-2.

The control section 5 includes a CPU (Central Processing Unit) 5-1, a ROM (Read Only Memory) 5-2, a RAM (Random Access Memory) 5-3, a communication circuit (CAN: Control Area Network) 5-4, an AD (Analog-Digital) converter 5-5 and a DA (Digital-Analog) converter 5-6.

The imaging device is arranged at an appropriate position of a vehicle such as inside of the wind shield glass. Thus, the imaging device 1 images an overtaking vehicle, an oncoming vehicle, a preceding vehicle, and the road ahead and detects the distance to the other vehicle, the direction of the other vehicle, the condition ahead of the controlled vehicle, brightness ahead and around the controlled vehicle, and the like by the image recognition processing. The imaging device 1 further images the state of the wind shield glass and detects the state of raining and mist on the wind shield by the image recognition processing.

According to at least one of the information on the distance to the other vehicle, the direction of the other vehicle, the condition ahead of the controlled vehicle, and the brightness ahead and around the controlled vehicle obtained by the image recognition processing, the light intensity and/or the illumination beam distance of the right and the left headlamps are controlled independently. Moreover, according to at least one of the raining state, the misty wind shield glass dulling state, and the like, the wiper operation speed and intermittence time are controlled and the defroster of the air conditioner is controlled.

The imaging lens 1-1 collects light from an object and forms its image on the light receiving surface of the imaging element 1-2. The imaging element 1-2 may be a monochromatic CCD and has on its light reception surface, photodiodes (a group of pixels) arranged in a matrix, a vertical charge transfer path group formed adjacent to the pixel group via the transfer gate, and a horizontal charge transfer paths formed at the end portion of the vertical charge transfer path group. All the pixel charge accumulated in the pixel group during the exposure time shorter than the field cycle is transferred to the vertical charge transfer paths group via the charge transfer gate simultaneously with the exposure period end. Furthermore, each pixel charge is read out point-successively, while string by string is transferred to the horizontal charge transfer path in synchronization with the scan read control signal applied to the transfer electrodes arranged in the vertical charge transfer paths.

Here, it is preferable that the imaging device 1 be composed of a single optical system. Here, the single optical system is an optical system of fixed focus, and fixed diaphragm (stop) without having a mechanism for changing the focus and the diaphragm. The input signal from the surroundings detection sensor is output to a plurality of auxiliary equipment as will be detailed later, so that the input signal to be processed is unified and, thereby enabling effective execution of the signal processing.

In the image processing section 3, the analog signal from the imaging element 1-2 is converted to a digital signal by the AD converter 3-1. This is subjected to the image processing logic in the image processing IC 3-2 and transferred to the RAM 5-3 of the control section 5. Here, the digital signal may be subjected to video processing (such as γ-correction processing).

Next, explanation will be given on the processing in the control section 5. According to the algorithm from the ROM 5-2, the CPU 5-1 subjects the video stored in the RAM 5-3 to difference extraction processing, edge extraction processing, and the like and transfers the result to the RAM 5-3. Furthermore, the CPU 5-1 performs image recognition processing from the processing result stored in the RAM 5-3 and detects the distance to and the direction of an overtaking vehicle, an oncoming vehicle, or a preceding vehicle and detects the brightness ahead and around the controlled vehicle, rain drop, rain amount, and mist on the wind shield.

From the video data stored in the RAM 5-3, the CPU 5-1 calculates the brightness ahead of the controlled vehicle. Moreover, the CPU 5-1 calculates the brightness rearward of the controlled vehicle from the backward lighting intensity sensor 4. From the brightness ahead of the controlled vehicle and the brightness rearward of the vehicle, the CPU 5-1 decides whether to turn on the lamps, light intensity, illumination brightness of the navigation device and dash light, transmittance ratio of the glare-proof mirror, and the like. Furthermore, the CPU 5-1 detects rain amount from the video data stored in the RAM 5-3 and controls the wiper operation speed and intermittence interval. Moreover, the CPU 5-1 detects the mist state of the wind shield glass and controls the defroster of the air conditioner.

The signal from the vehicle information sensor 11 is transmitted via the communication circuit (CAN) to the CPU 5-1 and the like. The signal from the CPU 5-1 is transmitted via the communication circuit (CAN) 5-4 to the auxiliary equipment 6, 7, 8, 9, 10.

In this embodiment, signals from the surroundings detection sensor 1 and the vehicle information sensor 11 are input to the control section. However, this does not eliminate an embodiment in which at least one of them is connected, i.e., only one of the sensors is provided to be used by the auxiliary equipment to be controlled.

Figure 2:
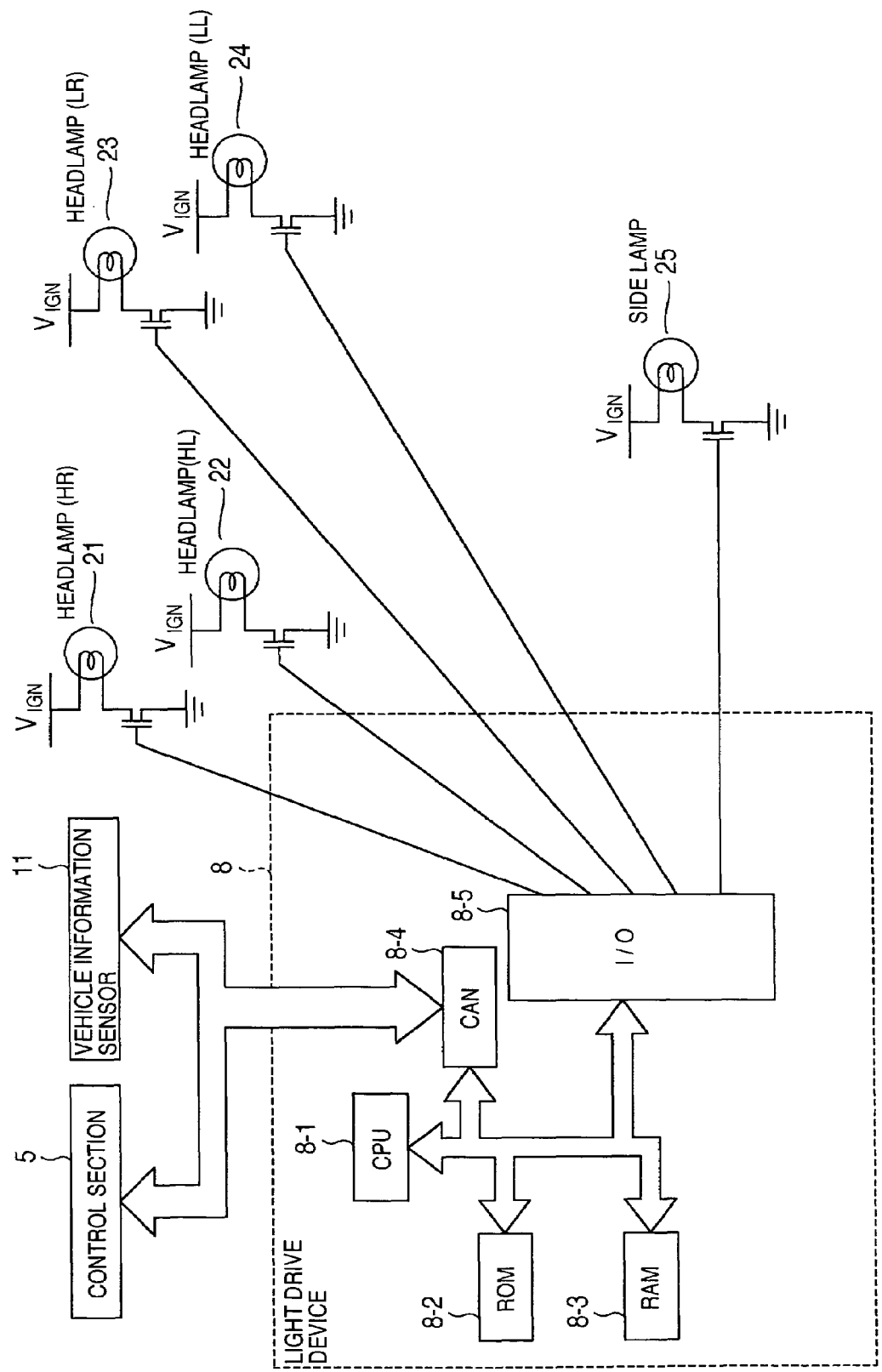
FIG. 2 shows configuration of a light drive device connected to the vehicle auxiliary equipment control device according to the present invention.

Referring to FIG. 2, explanation will be given on the light drive device 8. The light drive device 8 includes a CPU 8-1, a ROM 8-2, a RAM 8-3, a communication circuit (CAN) 8-4, and an I/O port 8-5. The light drive device 8 is connected via the communication circuit (CAN) 8-5 to the headlamps 21, 22, 23, 24 and sidelamp 25.

The headlamps include long beam (high beam) lamps 21, 22 for radiating far in the front and short beam (low beam) lamps 23, 24 not dazzling a driver of an oncoming vehicle. In this embodiment, the right and left lamps of the long beam (high beam) and the short beam (low beam) are controlled independently. That is, the radiation distance of the right and left headlamps are controlled independently. The long beam is also called "main beam" and the short beam is also called "low beam".

The light drive device 8 receives light intensity signal of the headlamp from the control section 5 via the communication circuit (CAN) 8-4. The CPU 8-1 generates a switching signal for cyclically turning on/off the transistor of the circuit arranged in each headlamp. When the ON time is set long, the lamp becomes brighter and when the ON time is set short, the lamp becomes darker. According the program stored in the ROM 8-2, the CPU 8-1 calculates the ON time one-to-one corresponding to the headlamp light intensity signal and modifies the I/O port state.

The side lamp 25 is mounted on the both sides of the front and back of the vehicle. The lighting state of the side lamp 25 is ON or OFF. The light drive device 8 receives a signal indicating the brightness of the front or around the vehicle from the control section 5 via the communication circuit (CAN) 8-4. Using the front or the surrounding brightness signal, the CPU 8-1 modifies the I/O port state according to the program stored in the ROM 8-2.

Furthermore, the light drive device 8 inputs the driver switch operation via the communication circuit (CAN) 8-4. Blinking of the headlamps and the side lamps is operated with priority by the driver switch operation. The switch state may be OFF, side lamps ON, low beam ON, high beam ON, and automatic state.

Figure 3:
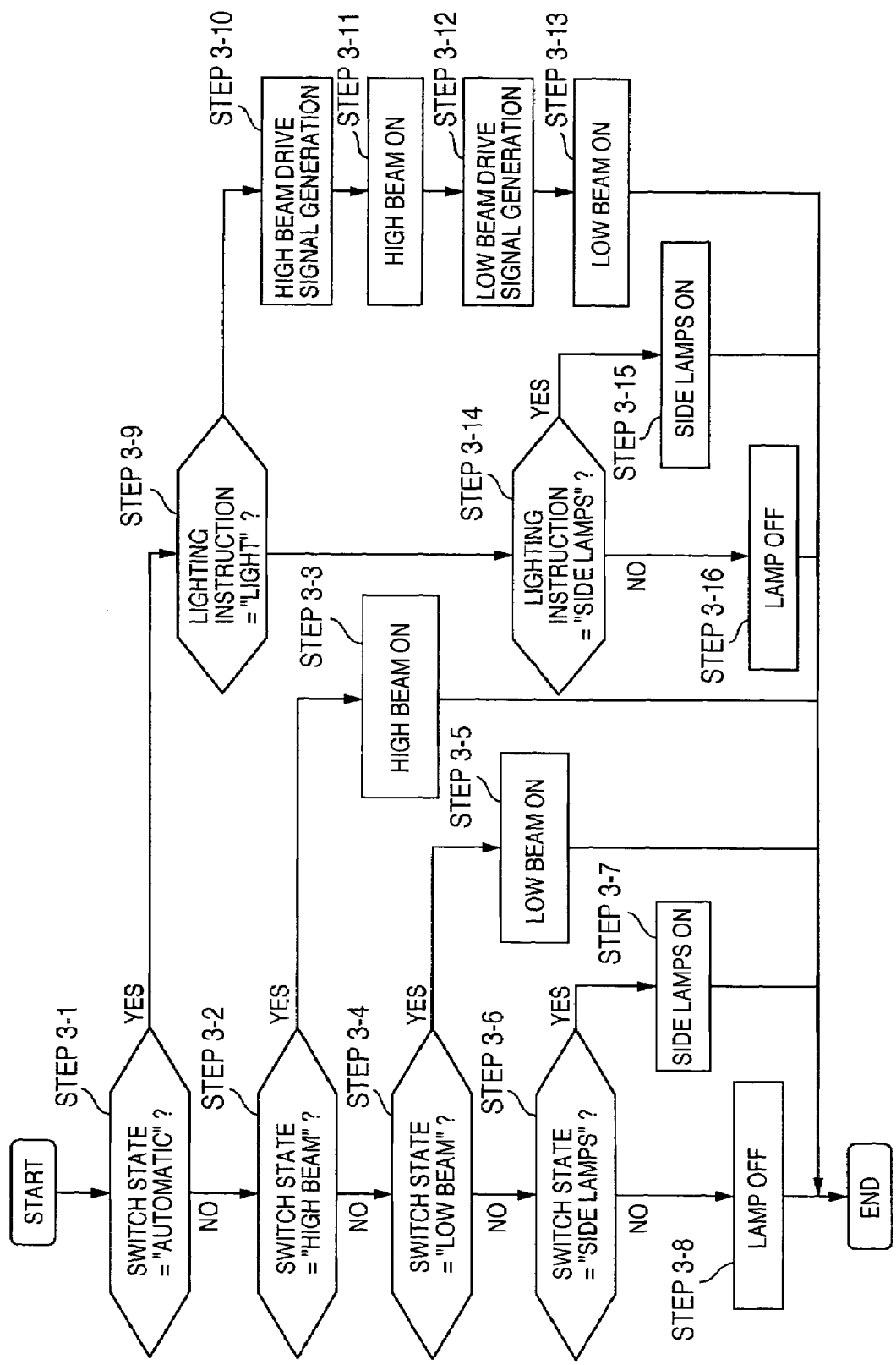
FIG. 3 is a flowchart showing the operation of the light drive device according to the present invention.

Referring to FIG. 3, explanation will be given on the blinking operation of the headlamps and the side lamps in the light drive device 8. In step 3-1, it is judged whether the switch state is "automatic". If other than "automatic", control is passed to step 3-2, where it is judged whether the switch state is "high beam". If the switch state is "high beam", control is passed to step 3-3, where the side lamps are turned on, the low beam is turned off, and high beam is turned on. When the switch state is other than "high beam", control is passed to step 3-4, where it is judged whether the switch state is "low beam". If the switch state is "low beam", control is passed to step 3-5, where the side lamps are turned on, the low beam is turned on, and the high beam is turned off.

When the switch state is other than "low", control is passed to step 3-6, where it is judged whether the switch state is the "side lamps". If the switch state is the "side lamps", control is passed to step 3-7 and only the side lamps are turned on. If the switch state is other than the "side lamps", control is passed to step 3-8, where all the lamps are turned off.

When the switch state is "automatic" in step 3-1, control is passed to step 3-9, where it is judged whether the lighting instruction transmitted from the control section is "light". If the lighting instruction is "light", control is passed to step 3-10, where a high beam drive signal is generated from the lighting intensity of the high beam transmitted from the control section 5. In step 3-11, high beam is turned on. Furthermore, in step 3-12, a low beam drive signal is generated from the lighting intensity of the low beam. In step 3-13, the low beam is turned on.

Here, explanation is given on a method for generating a beam drive signal from the beam lighting intensity. The beam lighting intensity transmitted from the control section 5 is expressed by the ratio of intensity of beam lighting, assuming 100% when the beam is fully lit and 0% when the beam is extinguished. According to this ratio, the drive time of the transistor driving the lamp is calculated. As has been described above, the lamp lighting is performed by cyclically repeating ON/OFF of the transistor, for example, every 10 msec. The lamp light intensity or lighting intensity is adjusted by adjusting the ratio of the ON and OFF during the lighting time. This ratio is set according to the beam lighting intensity. When the beam lighting intensity is 30%, the transistor is driven with the ON time of 3 msec and OFF time of 7 msec.

It should be noted that when the lighting instruction is "light" in step 3-9, as the initial value at lamp lighting or as the value of normal running, the dimming state preferably set. Here, the dimming state is the state generating brightness which does not dazzle the driver of the oncoming vehicle. It is preferable that the high beam be 50% or below and the low beam be 50% or above. It is also possible that the high beam is 0% and the low beam is 100%. By setting in this way, it is possible to evade sudden increase of light intensity at the turning on the lamps so as to present the driver of the oncoming vehicle from dazzling as safety improvement. It is also possible to evade the reflection of the light from a road sign and dazzling the driver of the controlled vehicle.

When the lighting instruction is other than "light" in step 3-9, control is passed to step 3-14, where it is judged whether the lighting instruction is the "side lamps". If the lighting instruction is the "side lamps", control is passed to step 3-15, where only the side lamps are turned on without turning on the high beam or the low beam. If the lighting instruction is other than the "side lamps", control is passed to step 3-15, where all the lamps are turned off.

Figure 4:
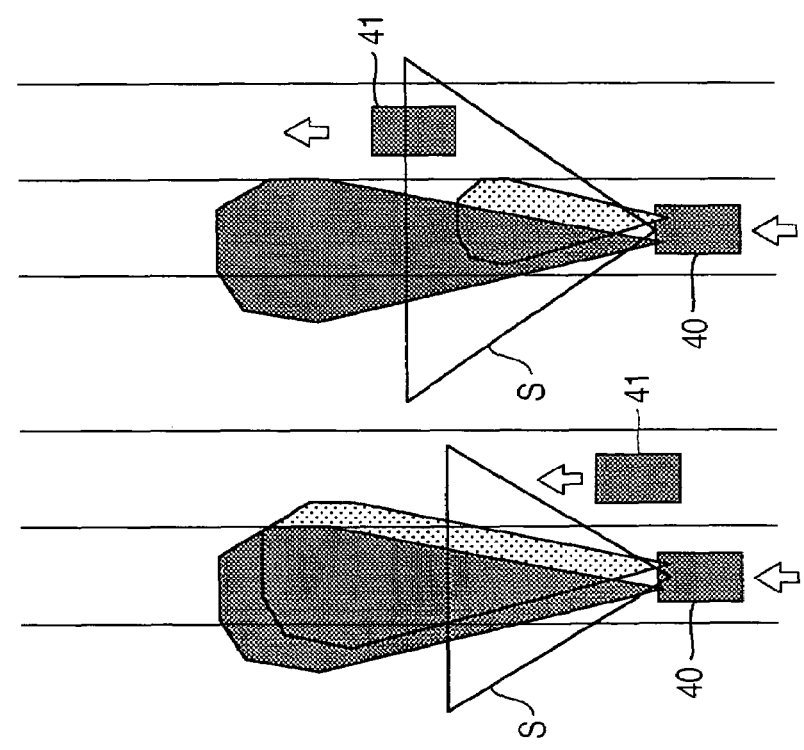
FIGS. 4A, 4B, 4C, and 4D show headlamp lighting states of a controlled vehicle when another vehicle overtakes the controlled vehicle.

Referring to FIGS. 4A to 4D, explanation will be given on the distance and azimuth to the overtaking vehicle and decision and operation of the light intensity of the headlamps. FIG. 4A indicates that an overtaking vehicle 41 is at the right of the controlled vehicle 40. The overtaking vehicle 41 does not get yet into the imaging angle of field S of the imaging device and is not detected. Here, the high beam of the right and left headlamps of the controlled vehicle 40 are lit by 100% since no vehicle is detected around. FIG. 4B shows the state that the overtaking vehicle 41 comes into the imaging angle of field S of the imaging device. The light intensity of the high beam of the right headlamp of the controlled vehicle 40 is lowered according to the distance to the overtaking vehicle 41 and the azimuth of the overtaking vehicle 41. FIG. 4C shows that the overtaking vehicle 41 has further proceeded. Here, the light intensity of the right and left headlamps of the controlled vehicle 40 is reduced according to the distance to the overtaking vehicle and the azimuth of the overtaking vehicle 41. FIG. 4D shows that the overtaking vehicle has further proceeded to a point where there is no fear of dazzling the driver of the overtaking vehicle by the headlamps of the controlled vehicle 40 and the light intensity of the headlamps of the controlled vehicle 40 is increased to the level of 100% (the same as FIG. 4A).

As has been explained above, by detecting the position of the overtaking vehicle, the light intensity of the headlamps of the controlled vehicle is adjusted. Accordingly, there is no fear of dazzling the driver of the overtaking vehicle and it is possible to assure forward field of view of the controlled vehicle. Here, explanation has been given on the case of detecting an overtaking vehicle. The same applies when detecting a preceding vehicle and an oncoming vehicle.

Here, when increasing the light intensity to the level of 100%, it is preferable to control to increase the light intensity stepwise or continuously. More specifically, in step 3-10, and in step 3-12 of FIG. 3, an internal counter or an internal timer is used so as to change the high and low beam drive signals stepwise or linearly. Moreover, when reducing the light intensity of the headlamps, it is preferable to reduce the light intensity instantaneously, or more rapidly than when increasing the light intensity. Thus, for example, when an overtaking vehicle comes in the imaging angle at a high speed while increasing the light intensity, the light intensity can rapidly be reduced to prevent dazzling the river of the overtaking vehicle, thereby increasing the safety.

Figure 5:
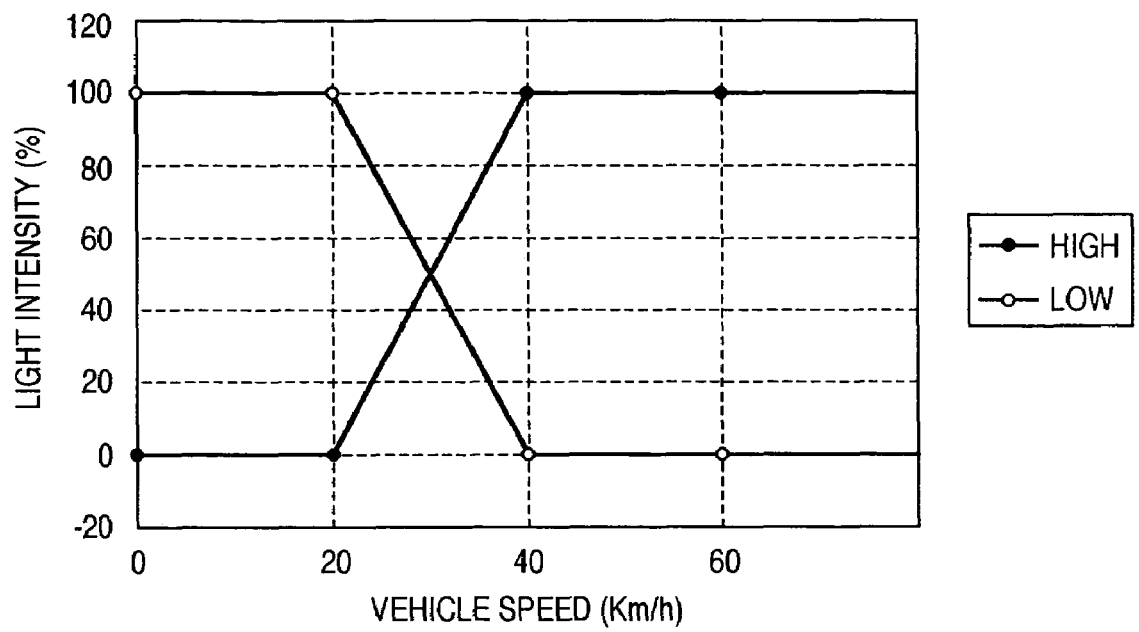
FIG. 5 shows the relationship between the vehicle velocity and the headlamp light intensity.
Figure 6:
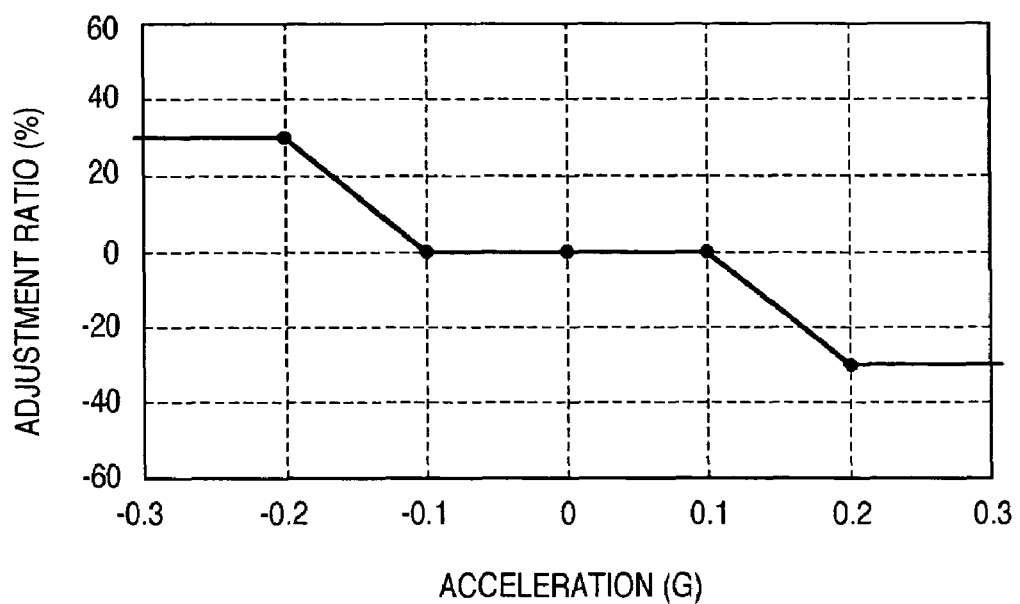
FIG. 6 shows the relationship between the vehicle velocity and the headlamp light intensity adjustment ratio.
Figure 7:
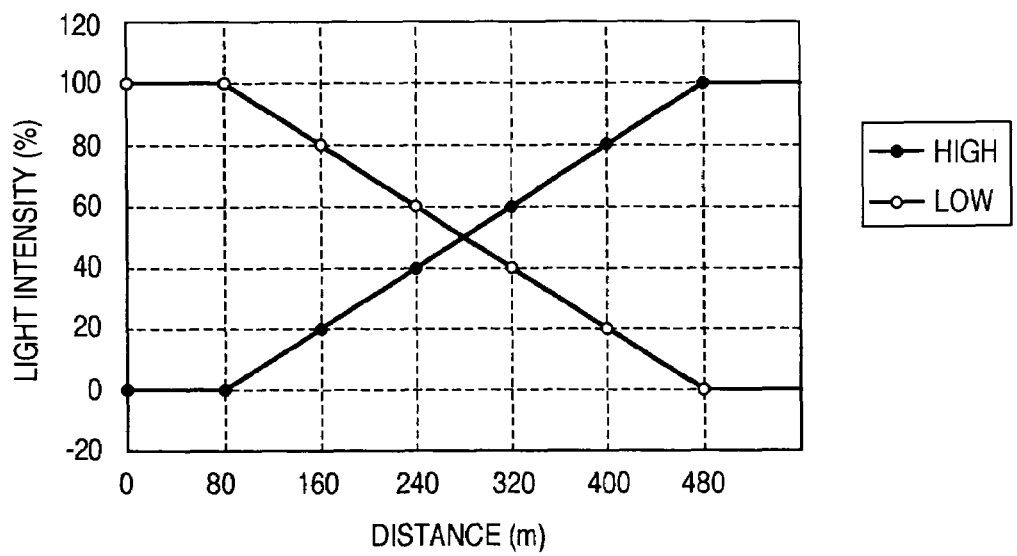
FIG. 7 shows the relationship between the distance from a controlled vehicle to a oncoming vehicle or overtaking vehicle and the headlamp light intensity.

Next, referring to FIG. 5, FIG. 6, and FIG. 7, explanation will be given on the method for determining the light intensity of the beam of the headlamps. In the first example, the light intensity of the headlamp beam is decided according to the vehicle speed. As shown in FIG. 5, at the low speed (for example, 20 km/h or below), the high beam is turned off and only the low beam is turned on. When the vehicle speed is increased, the high beam is turned on and the light intensity of the low beam is reduced. At the high speed (for example, at 40 km/h or above), the light intensity of the high beam is made maximum. Thus, the driver's psychology that "he or she wants to see farther obstacle as the vehicle speed increase" can be satisfied. In this example, the light intensity is decided by the following equation.

$$\text{Light intensity of low beam} = 100 - \text{light intensity of high beam} \tag{1}$$

Next, in the second example, the light intensity of the headlamps is corrected when the vehicle is accelerated or decelerated. When the vehicle speed is accelerated, since the front end of vehicle is directed upward, the optical axis of the headlamp is directed upward and the headlamp is substantially inclined in the pitch direction of the vehicle body. Accordingly, there is a fear of dazzling the driver of the oncoming vehicle. Consequently, as shown in FIG. 6, the light intensity of the headlamps is adjusted in the decrement direction. When the vehicle is decelerated, since the front end of the vehicle declines the optical axis of the headlamps is directed downward and the illumination range ahead of the vehicle be comes shorter. That is, the driver's viewing region becomes shorter. Accordingly, as shown in FIG. 6, the light intensity of the headlamps is adjusted in the increment direction.

In the third example, the light intensity of the headlamp beam is determined according to the distance from the controlled vehicle to the overtaking vehicle, oncoming vehicle, or preceding vehicle. When the distance from the controlled vehicle to the other vehicle is short, there is a fear of dazzling the driver of the other vehicle by the high beam. On the other hand, when the distance from the controlled vehicle to the other vehicle is long, there is little fear of dazzling the driver of the other vehicle by the high beam. As shown in FIG. 7, when the distance from the controlled vehicle to the other vehicle is short, the light intensity of the high beam is made weak and when the distance from the controlled vehicle to the other vehicle is long, the light intensity of the high beam is made strong. The light intensity of the low beam is calculated by the following equation $$\text{Light intensity of low beam} = 100 - \text{light intensity of high beam} \tag{2}$$

The light intensity of the headlamp beam is determined by combining the intensities of the beam obtained by the aforementioned three methods.

Next, referring to FIG. 8, FIG. 9, and FIG. 10, explanation will be given on the method for generating a lighting instruction of the headlamps according to an image signal from an imaging device.

Figure 8:
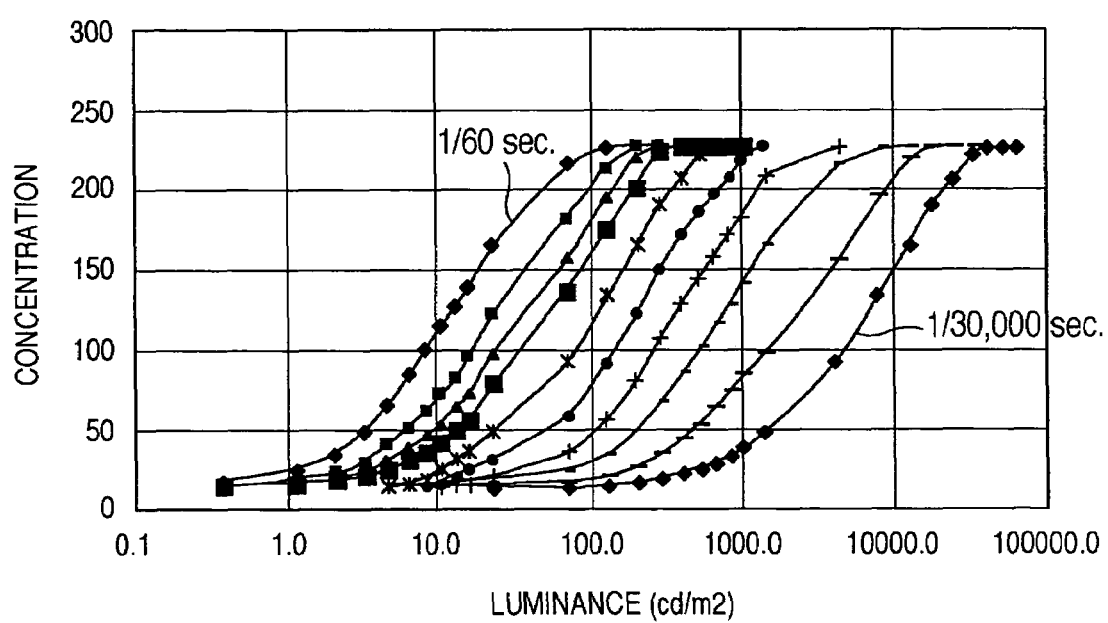
FIG. 8 shows the relationship between the brightness of an object and concentration of the signal of the image pickup element.

FIG. 8 shows the relationship between the luminance (cd/m) of an object when the shutter speed is changed in the imaging device (horizontal axis) and the signal value (defined as concentration value) acquired into the RAM via the imaging element (vertical axis). The ten curves shown in FIG. 8 shows characteristics in different ten shutter speeds. Here, the shutter speed is a time for accumulating electric charge in the imaging element. The shutter speeds of the 10 curves in FIG. 8 are $1/60$, $1/120$, $1/180$, $1/250$, $1/500$, $1/1000$, $1/2000$, $1/4000$, $1/10000$, $1/30000$ sec. from the left.

In each of the curves, when the object luminance is greater and smaller than a predetermined value, the concentration value becomes constant or saturated. For example, when an oncoming vehicle is imaged at a certain shutter speed, since the luminance of the headlamps of the oncoming vehicle is strong, the concentration value is bright-saturated, causing blooming. The blooming will be detailed later with reference to FIG. 11. Moreover, when a region out of the illumination by the headlamps is imaged at the road having no road illumination, the obstacle is too dark and the concentration value is dark-saturated. In such a case, by changing the shutter speed, an appropriate concentration value can be obtained. The shutter speed preferably is set so that the concentration value is 80 to 160.

Figure 9:
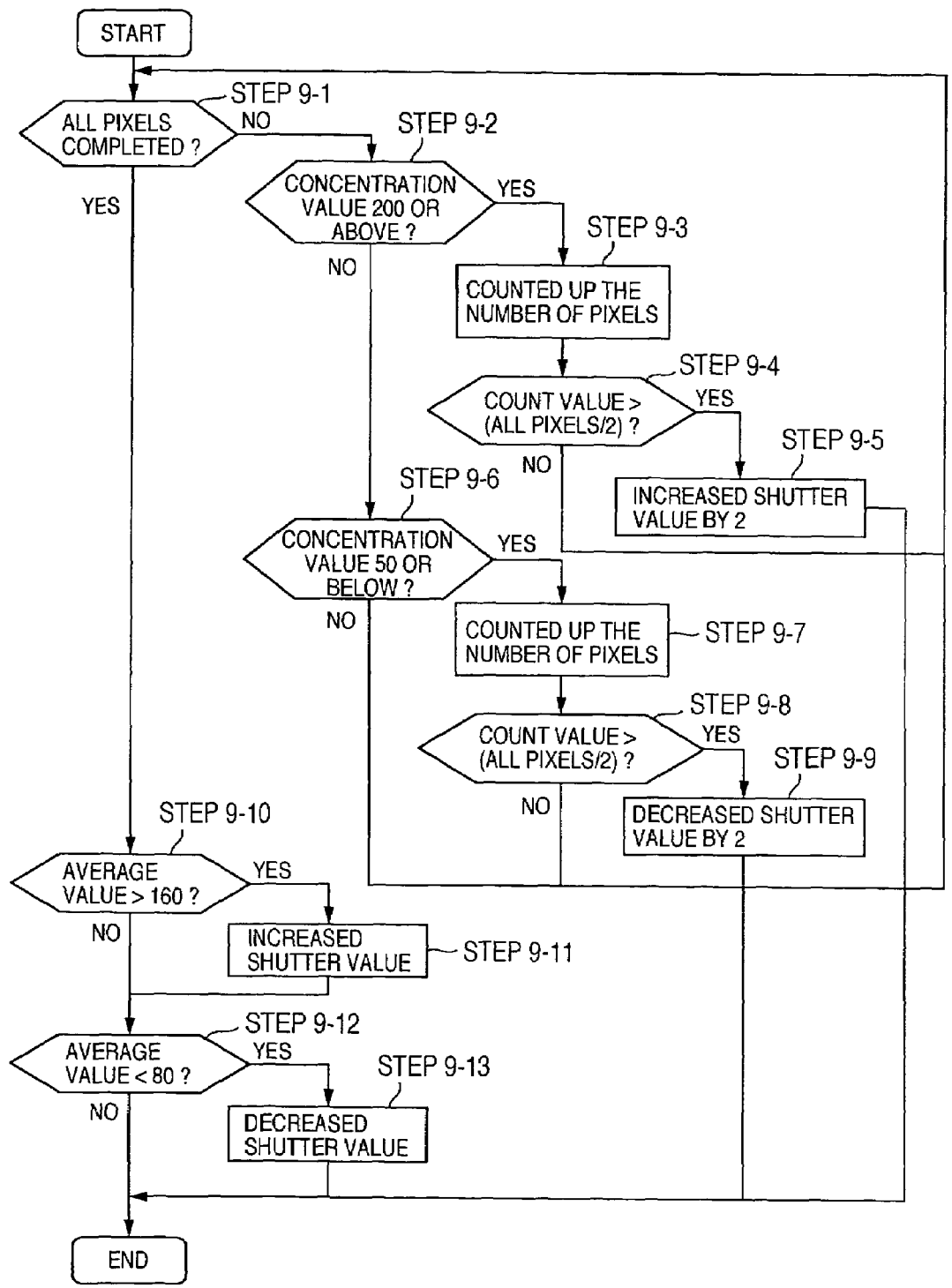
FIG. 9 is a flowchart explaining the processing for calculating the appropriate shutter speed.

Referring to FIG. 9, explanation will be given on the method for determining the appropriate shutter speed. In this case, ten levels of shutter values are defined from "1" to "10" in stepwise which correspond to the shutter speeds $1/600$ to $1/30,000$ sec. as shown in FIG. 8. That is, the larger shutter value represents faster shutter speed. In step 9-1, it is judged whether the following processes are complete for all the pixels of the imaged video data. Unless the processes are complete, control is passed to step 9-2, it is judged whether the concentration value of the pixel to be processed currently is 200 or above. If the concentration value is 200 or above, it is judged that saturation is obtained and control is passed to step 9-3, where the counter for the number of bright-saturation pixels is incremented. In step 9-4, it is judged whether the count value of the counter of the number of bright-saturation pixels occupy half or more than half of all the pixels. When the count value of counter for the number of the bright-saturation pixels is half or more than half of all the pixels, control is passed to step 9-5, where it is judged that the current shutter speed is not appropriate and the shutter value is increased by two steps, thereby terminating the process. In step 9-4, if the count value of the counter for the number of bright-saturation pixels is less than half of all the pixels, control is returned to step 9-1.

In step 9-2, if the concentration value of the pixel to be processed currently is smaller than 200, control is passed to step 9-6. In step 9-6, it is judged whether the concentration value of the pixel to be processed currently is 50 or below. If the concentration value is 50 or below, control is passed to step 9-7, where the counter for the number of dark-saturation pixels is incremented. In step 9-8, it is judged whether the count value of the counter for the number of dark-saturation pixels is half or more than half of all the pixels. If the count value of the counter for the dark-saturation pixels is half or more than half of all the pixels, control is passed to step 9-9, where it is judged that the current shutter speed is not appropriate and the shutter value is decreased by two steps, there by terminating the process.

In step 9-8, if the count value of the counter for the number of dark-saturation pixels is smaller than the half of all the pixels, control is returned to step 9-1. In step 9-6, if the concentration value of the pixel to be processed currently exceeds 50, control is returned to step 9-1.

In step 9-1, if the aforementioned processes are complete for all the pixels of the imaged video, control is passed to step 9-10 and an average value of the concentration values of the pixels of the video is calculated. It is judged whether the average value obtained is greater than 160. If the average value of the concentration values is greater than 160, control is passed to step 9-11, where the current shutter value is increased by one step and control is passed to step 9-12. If the average value of the concentration values is not greater than 160, control is passed to step 9-12.

In step 9-112, it is judged whether the average value of the concentration values is smaller than 80. If the average value of the concentration values is smaller than 80, control is passed to step 9-13 and the shutter value is decreased by one step. If the average value of the concentration values is not smaller than 80, the process is terminated.

Figure 10:
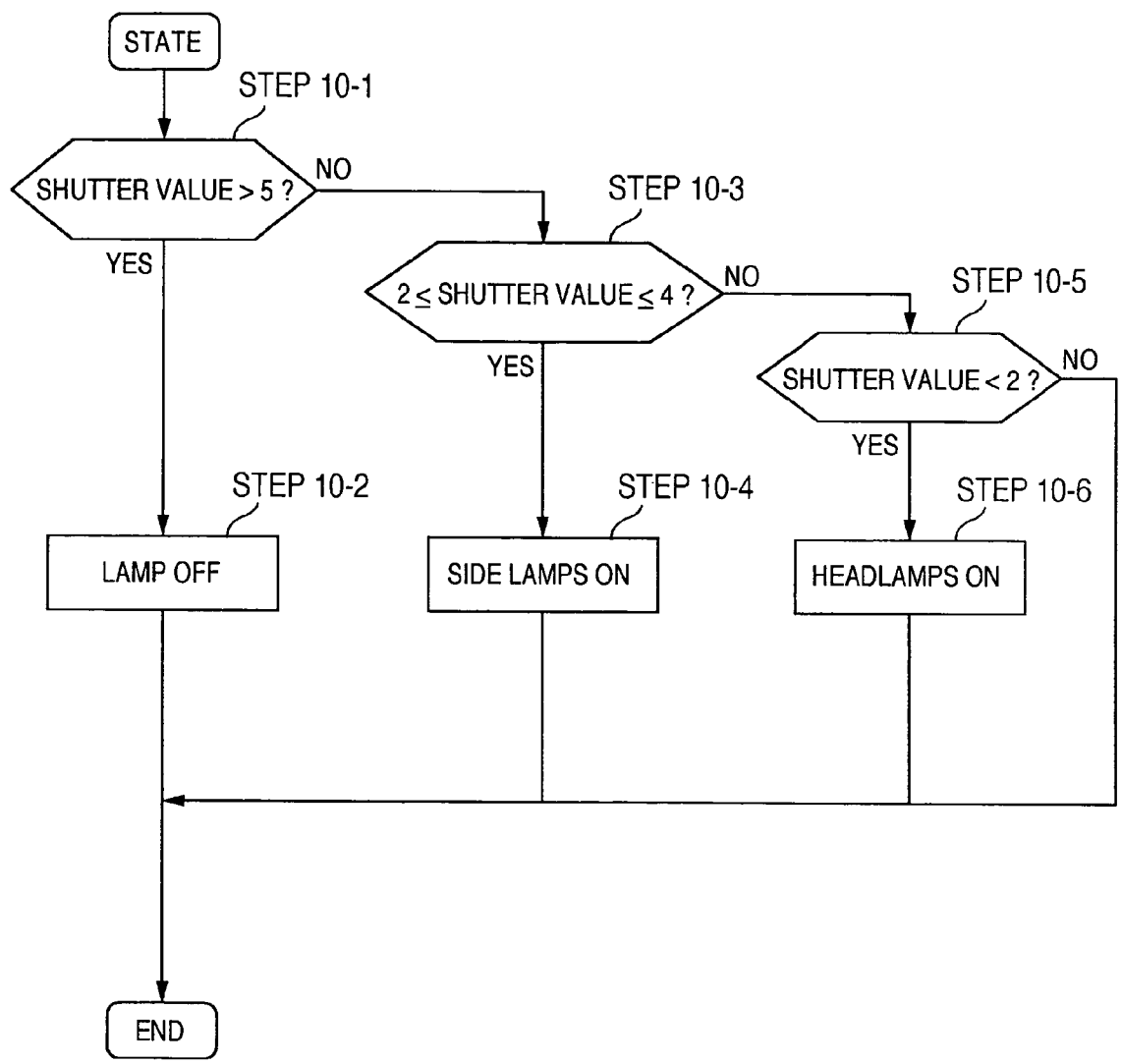
FIG. 10 is a flowchart explaining the processing for generating a lighting instruction for the headlamps and the side lamps.

Referring to FIG. 10, explanation will be given on the method for judging whether to turn on the headlamps according to the shutter speed. In step 10-1, it is judged whether the shutter value is greater than 5. When the shutter value is greater than 5, it is judged that the time is day time and control is passed to step 10-2, where the headlamps and the side lamps are turned off. When the shutter value is not greater than 5, control is passed to step 10-3, where it is judged whether the shutter value is not smaller than 2 and not greater than 4. If the shutter value is not smaller than 2 and not greater than 4, it is judged that the time is twilight hour and control is passed to step 10-4, where the only the side lamps are turned on. If the shutter value is not in the range of 2 to 4, control is passed to step 10-5, where it is judged whether the shutter value is smaller than 2. If the shutter value is smaller than 2, the shutter value is 1 and it is judged that the time is evening hour. Control is passed to step 10-6 and the headlamps are turned on. If the shutter value is not smaller than 2, the shutter value is 5 and the current state is maintained.

Figure 11A:
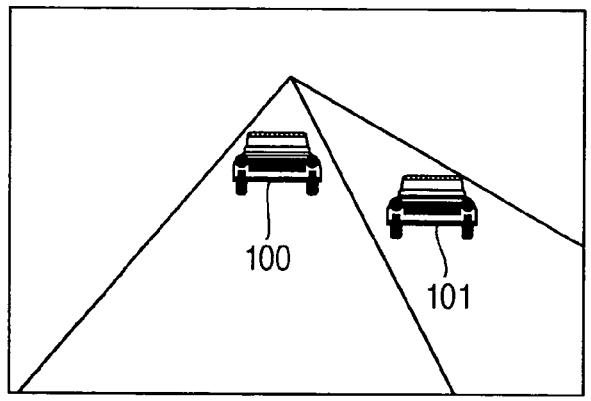
FIGS. 11A, 11B, and 11C are diagrams for explaining the results of imaging of the preceding vehicle and the oncoming vehicle imaged by an imaging device at night.

Referring FIGS. 11A, 11B, and 11C, explanation will be given on the method for detecting a preceding vehicle and an oncoming vehicle. FIG. 11A shows that a preceding vehicle 100 (vehicle at the left in the figure) and an oncoming vehicle 101 (vehicle at the right in the figure) exist ahead of the controlled vehicle (not depicted). In the evening, the preceding vehicle 100 and the oncoming vehicle 101 have side lamps and headlamps turned on. Accordingly, the shutter speed is set so that the range of the side lamps and the headlamps will not cause blooming when performing imaging. Since the brightness of the side lamps and that of headlamps are different greatly, it is impossible to obtain an image not causing blooming without setting different shutter speeds for imaging.

Figure 11B:
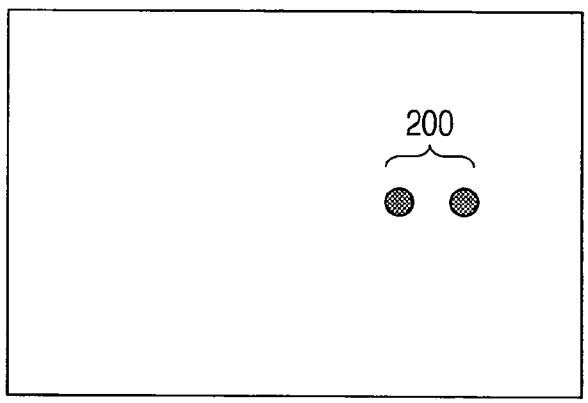

FIG. 11B shows an image obtained by imaging the view ahead of the controlled vehicle with a fast shutter speed. The side lamps of the vehicles 100, 101 ahead are not imaged since they are darker than the headlamps and only the headlamps of the oncoming vehicle 101 are imaged. The pair of right and left bright portions 200 is the range of the oncoming vehicle 101. The distance between the two bright portions 200 is proportional to the distance between the controlled vehicle to the oncoming vehicle 101. Accordingly, by calculating the distance between the two bright portions 200, it is possible to calculate the distance between the controlled vehicle and the oncoming vehicle 101. Moreover, the horizontal position of the two bright portions 200 defines the azimuth from the controlled vehicle to the oncoming vehicle 101.

Figure 11C:
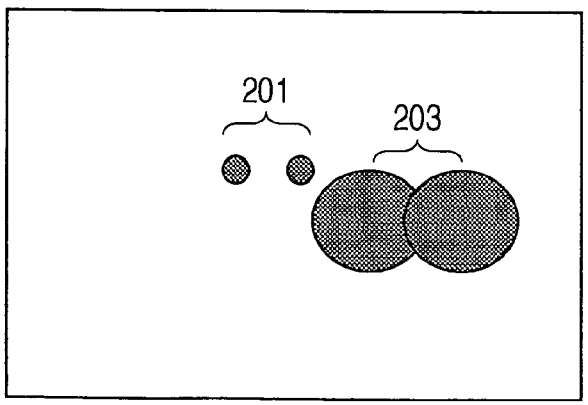

FIG. 11C shows an image obtained by imaging the view ahead of the controlled vehicle with a slow shutter speed. The side lamps 201 of the preceding vehicle 100 do not cause blooming while the headlamps 203 of the oncoming vehicle 101 cause blooming when imaged.

Referring to FIG. 12, FIG. 13, FIG. 14, and FIG. 15, explanation will be given on the operation timing in the vehicle auxiliary equipment control device. In these timing charts, the horizontal axis represents the time in the unit of field (one field: 16.7 msec). In this example, the operation or process in the vehicle auxiliary equipment control device is performed by time-shared processing division in the unit of field. As has been explained with reference to FIG. 11, when detecting an oncoming vehicle, imaging is performed with a fast shutter speed so as to prevent blooming. When detecting a preceding vehicle, imaging is performed with a slow shutter speed so as to obtain the image of the side lamps.

Figure 12:
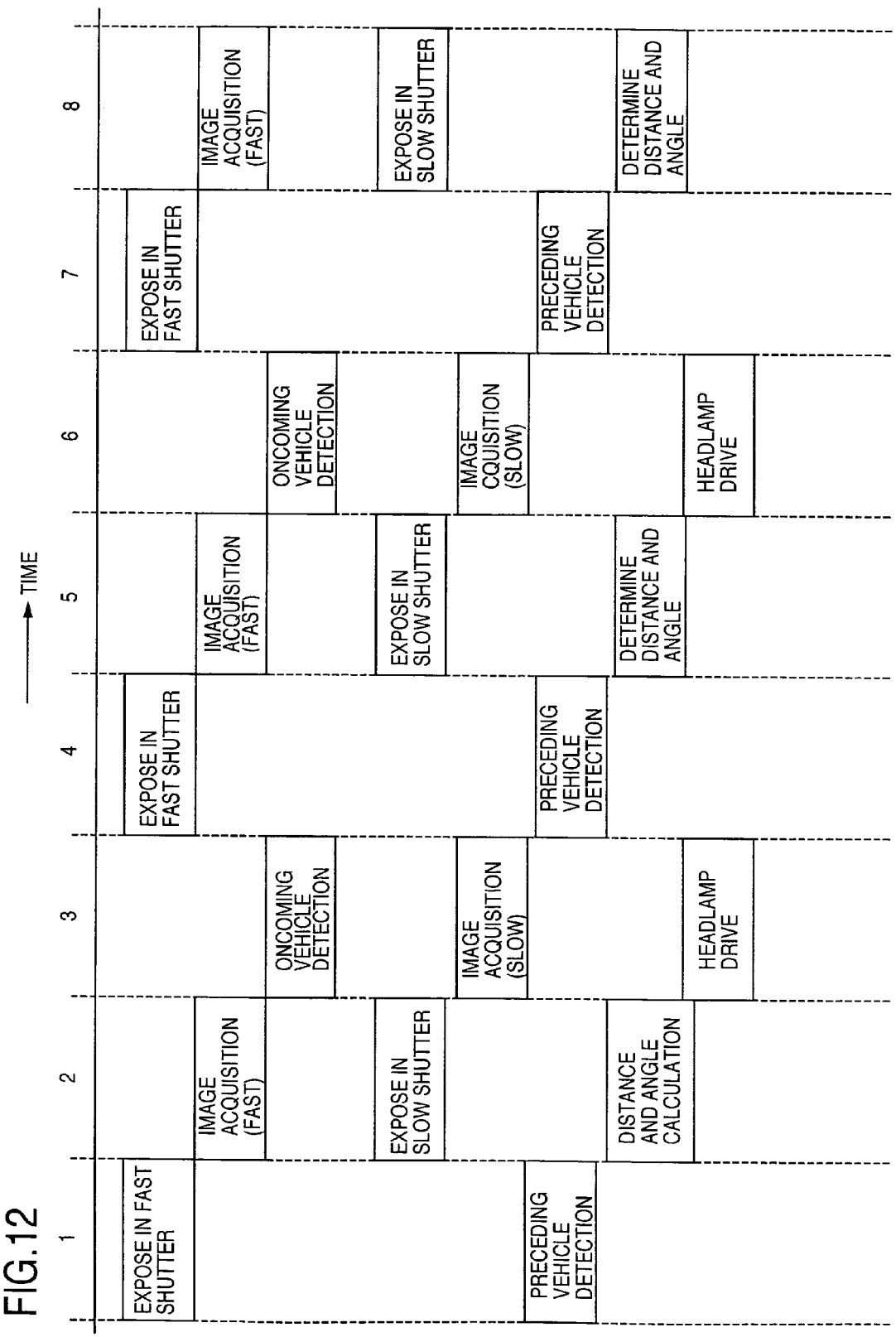
FIG. 12 is a timing chart showing the timings to execute only the operation for modifying the headlamp light intensity when the driver performs light turning ON by the switch operation.

FIG. 12 is a timing chart when the headlamps are turned on by the switch operation by the driver and only the function for modifying the light intensity of the headlamps is automatically executed by detecting a preceding vehicle or an oncoming vehicle. In the first field, the imaging element 102 of the imaging device 1 performs exposure with a fast shutter speed to detect an oncoming vehicle. In the second field, the image processing section 3 acquires an image obtained by the fast shutter speed. Here, simultaneously with this, the imaging element 1-2 performs exposure with a slow shutter speed to detect a preceding vehicle.

In the third field, the control section 5 detects an oncoming vehicle from the image obtained by the fast shutter speed. Simultaneously with this, the image processing section acquires the image obtained by the slow shutter speed. In the fourth field, the control section 5 detects a preceding vehicle from the image obtained with the slow shutter speed and simultaneously with this, the imaging element 1-2 of the imaging device 1 performs exposure with a fast shutter speed. In the fifth field, the control section 5 calculates the distance and azimuth of the oncoming vehicle detected in the third field and calculates the distance and azimuth of the preceding vehicle detected in the fourth field to obtain the light intensity of the beam of the headlamps. Simultaneously with this, the image processing section 3 acquires the image obtained by the fast shutter speed and the imaging element 1-2 performs exposure with a slow shutter speed.

In the sixth field, the control section 5 outputs the beam light intensity via the communication section (CAN) 5-4 to the beam drive device 8. Simultaneously with this, the control section 5 detects an oncoming vehicle from the image obtained with the fast shutter speed and the image processing section 3 acquires the image obtained with the slow shutter speed. The aforementioned is a series of processes and a processing cycle of 3 fields (about 50 msec) can be realized.

In this example, in one field, a plurality of processes are performed simultaneously. For example, in the fifth field, "acquisition of the image obtained with the fast shutter speed," "exposure with a slow shutter speed", and "calculation of distance and azimuth" are performed. However, these processes are performed in the different signal processing sections. For example, the "acquisition of the image obtained with the fast shutter speed," is performed by the image processing section 3, "exposure with a slow shutter speed" is performed by the imaging device 1, and "calculation of distance and azimuth" is performed by the control section 5. Accordingly, the operation efficiency of the signal processing section is increased.

Figure 13:
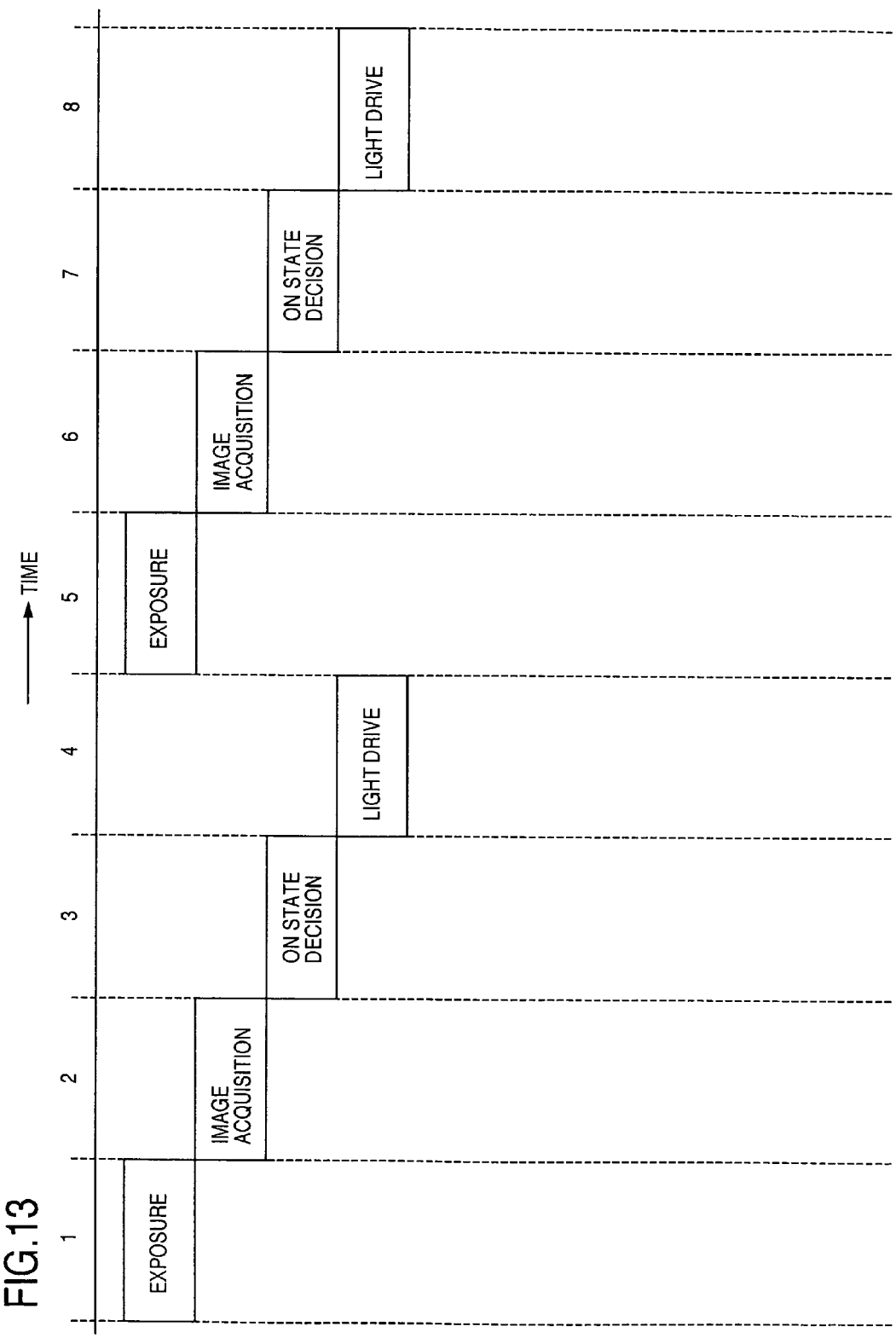
FIG. 13 is a timing chart showing the timings to execute only judgment operation whether to light the lamps without executing the function of modifying the light intensity of the headlamps when the surrounding is light such as during day time.

FIG. 13 shows a timing chart of lighting operation of the automatic lighting in the daytime. In the daytime when the surrounding is bright, the headlamps are not turned on and there is no need of modifying the light intensity of the headlamps. Accordingly, only the automatic lighting function is performed to judge whether the surrounding has become dark and the headlamps are to be turned on.

In the first field, the imaging element 1-2 of the imaging device 1 performs exposure with the shutter speed decided in the preceding process. In the second field, the image processing section 3 acquires the image. In the third field, the control section 5 judges whether to turn on the headlamps from the image acquired. In the fourth field, the control section 5 outputs the instruction whether to turn on via the communication section (CAN) 5-4 to the beam drive device 8. The aforementioned is a series of processes and the processing cycle of 4 fields (about 66.7 msec) is realized.

Figure 14:
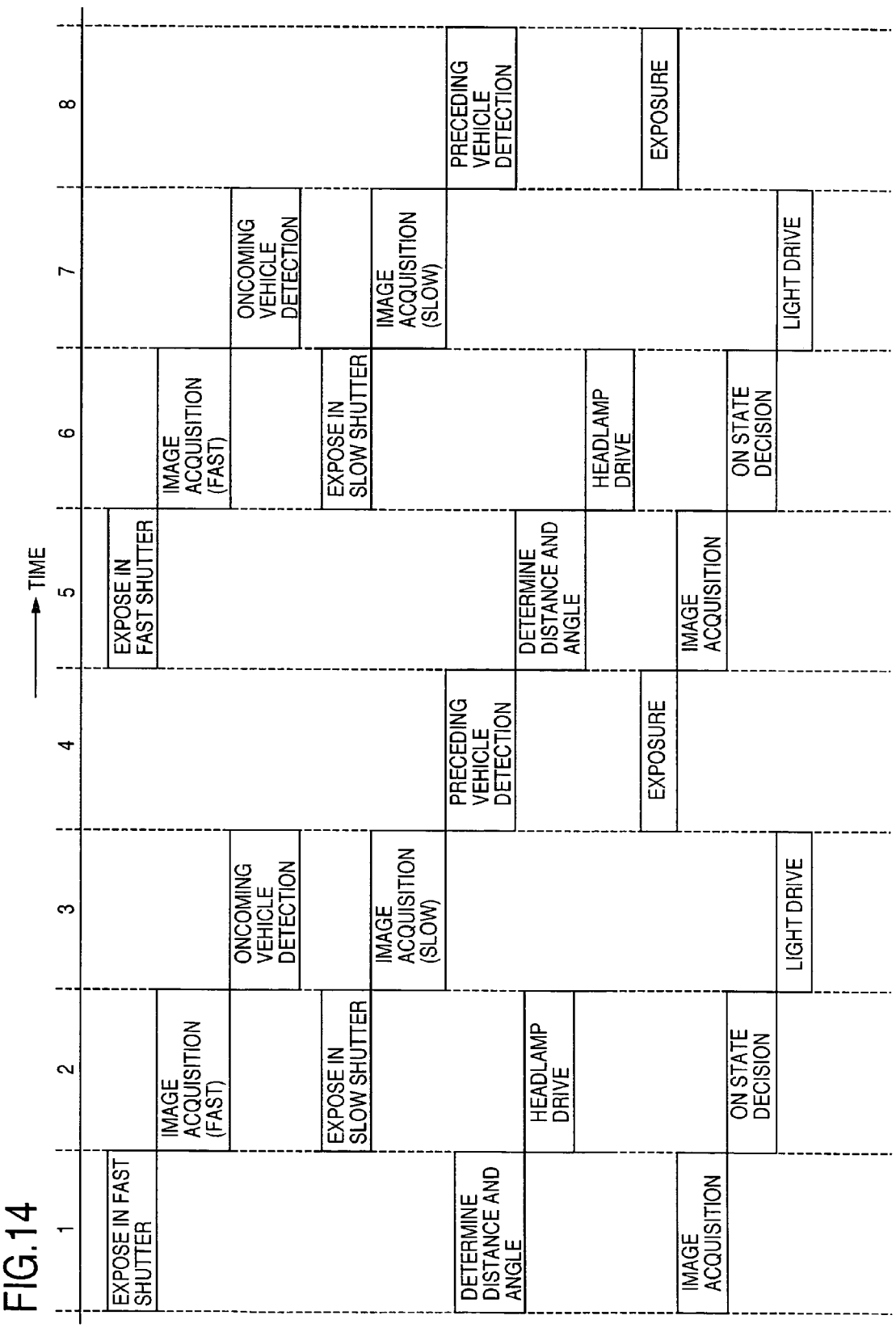
FIG. 14 is a timing chart showing the timings to simultaneously execute the function of automatic lighting the function for modifying the light intensity of the headlamps when the surrounding brightness is changing such as at twilight hours.

FIG. 14 shows a time chart when simultaneously performing the automatic lighting function and the function for modifying the light intensity of the headlamps while the surrounding brightness is changing such as in a twilight hour. The four processes contained in the time chart of FIG. 13 are inserted into the time chart of FIG. 12. However, in one field, only one exposure process can be inserted. In one field, only one image acquisition by the image processing section 3 can be performed.

In this example, exposure with a fast shutter speed is performed for detecting an oncoming vehicle in the first, the fifth, and the ninth field while exposure with a slow shutter speed is performed for detecting a preceding vehicle in the second, the sixth, and the tenth field. Exposure for automatic lighting is performed in the fourth, the eighth, the twelfth fields.

Figure 15:
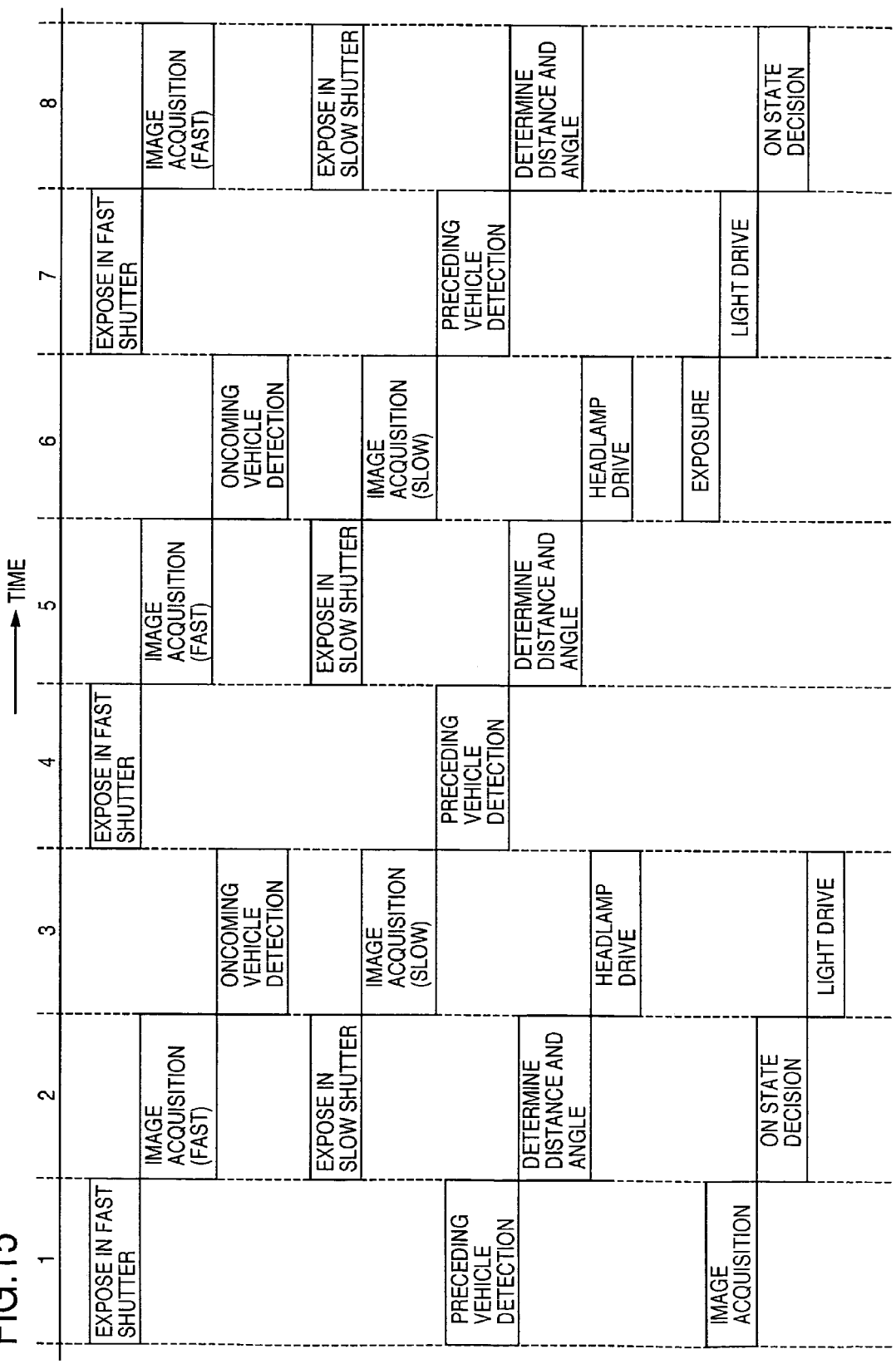
FIG. 15 is a timing chart showing the timings to simultaneously execute the function of automatic lighting and the function for modifying the light intensity of the headlamps.

FIG. 15 shows a time chart for simultaneously performing the automatic lighting function and the function for modifying the light intensity of the headlamps when the night has come and the surrounding brightness is changed. The four processes contained in the time chart of FIG. 13 are inserted into the time chart of FIG. 12. In this example, the exposure with a fast shutter speed for detecting an oncoming vehicle is performed in the first, the fourth, and the seventh field while the exposure with a slow shutter speed for detecting a preceding vehicle is performed in the second, the fifth, and the eighth field. The exposure for automatic lighting is performed in the sixth, the twelfth, and the eighteenth field.

The present invention has been thus far explained. However, it is understood by those skilled in the art that the present invention is not to be limited to the example given here but can be modified in various ways without departing from the scope of the inventions as is disclosed in the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus for controlling operation of auxiliary equipment of a vehicle by receiving an output of a surroundings detection sensor including an imaging device for detecting the surrounding of the vehicle and an output of a vehicle information sensor for detecting operation of the vehicle, wherein said surrounding detection sensor including the imaging device detects an oncoming vehicle and a preceding vehicle such that said surrounding detection sensor detects the oncoming vehicle at higher shutter speed with said imaging device and detects the preceding vehicle at lower shutter speed with said imaging device, a distance and direction to the oncoming vehicle are calculated according to the output of the surroundings detection sensor obtained by detecting the oncoming vehicle at the higher shutter speed with said imaging device, and a distance and direction the preceding vehicle are calculated according to the output of the surroundings detection sensor obtained by detecting the preceding vehicle at the lower shutter speed with said imaging device, so as to independently control light intensities and/or beam distances of right and left headlamps.

2. An apparatus as claimed in claim 1, wherein when an overtaking vehicle is detected by the surroundings detection sensor, the light intensities of the right and the left headlamps are controlled with a time difference.

3. An apparatus as claimed in claim 1, wherein the light intensity of the headlamps is controlled according to the speed of the vehicle obtained from the vehicle information sensor.

4. An apparatus as claimed in claim 1, wherein the light intensity of the headlamps is controlled according to the acceleration or deceleration of the vehicle obtained from the vehicle information sensor.

5. An apparatus as claimed in claim 4, wherein when the acceleration or deceleration of the vehicle obtained from the vehicle information sensor exceeds a predetermined value, it is judged that the vehicle is inclined in the pitch direction and the light intensity of the headlamps is increased or decreased.

6. An apparatus as claimed in claim 1, wherein a plurality of processes required for controlling the vehicle auxiliary equipment are performed by a time division processing.

7. An apparatus as claimed in claim 6, wherein a plurality of processes performed by different signal processing devices are assigned to one unit time of the time division in the time division processing.

8. An apparatus as claimed in claim 6, wherein the time unit of the time division in the time division processing is one field of an image signal obtained by an imaging device included in the surroundings detection sensor.

9. An apparatus as claimed in claim 6, wherein the plurality of processes executed by the time division processing are modified according to the surrounding condition detected by the surroundings detection sensor.

10. An apparatus as claimed in claim 6, wherein among the plurality of processes executed by the time division processing, a group of processes executed by each output of the surroundings detection sensor is cyclically executed.

11. An apparatus as claimed in claim 6, wherein the surroundings detection sensor includes an imaging device mounted on the inside of the windshield of the vehicle and the image obtained by the imaging device is subjected to image recognition processing, thereby detecting at least one of the distance to another vehicle, a direction of another vehicle, brightness of the front or surrounding, rain amount, and the mist amount on the windshield.

12. An apparatus as claimed in claim 11, wherein the light intensities and/or beam distance of the right and left headlamps are independently controlled according to at least one of the distance to the another vehicle, the direction of the another vehicle, and the brightness of ahead of or the surrounding of the vehicle.

13. An apparatus as claimed in claim 11, wherein the operation speed and intermittence time of wipers are controlled according to the rain amount detected in the image recognition processing and the defroster of the air conditioner is controlled according to the mist amount of the windshield.

14. An apparatus for controlling headlamps as auxiliary equipment of a vehicle by receiving an output of a surroundings detection sensor including an imaging device for detecting the surrounding of the vehicle and an output of the vehicle information sensor for detecting operation of the vehicle, according to claim 1,
wherein a shutter speed of the imaging device is set so as to eliminate dark-saturation or bright-saturation of the output of the surroundings detecting sensor, the headlamps are set to a dimming state when the headlamps are turned on and/or during normal running and light intensities of the headlamps are increased according to the shutter speed of the imaging device of the surroundings detection sensor and the output of the vehicle information sensor.

15. An apparatus as claimed in claim 14, wherein the surroundings detection sensor detects the brightness around the vehicle in accordance with the set shutter speed of the imaging device of the surroundings detection sensor.

16. An apparatus as claimed in claim 14, wherein the surroundings detection sensor detects the distance to and/or the direction of an overtaking vehicle, an oncoming vehicle, or a preceding vehicle.

17. An apparatus as claimed in claim 14, wherein the light intensity increase control changes the light intensity and/or beam distance of the headlamps.

18. An apparatus as claimed in claim 14, wherein the light intensity increase control changes the light intensity and/or beam distance of the headlamps stepwise or continuously.

19. An apparatus as claimed in claim 14, wherein the light intensity of the headlamps is reduced faster than the light intensity increase speed according to the output of the surroundings detection sensor and the vehicle information sensor.

20. An apparatus as claimed in claim 6, wherein an input signal from the surroundings detection sensor composed of a single optical system is output to the plurality of auxiliary equipment.

21. An apparatus as claimed in claim 14, wherein the shutter speed of the imaging device of the surrounding detection sensor is higher than a predetermined value, the headlamps and side lamps are turned off.

22. An apparatus as claimed in claim 14, wherein the shutter speed of the imaging device of the surrounding detection sensor is slower than a predetermined value, the headlamps are turned on.

23. An apparatus as claimed in claim 14, wherein the shutter speed of the imaging device of the surrounding detection sensor corresponds to a time for accumulating electric charge in the imaging device.

* * * * *